No. 749,195. Patented January 12, 1904.

UNITED STATES PATENT OFFICE.

MEINHARD HOFFMANN, OF FRANKFORT-ON-THE-MAIN, GERMANY, ASSIGNOR TO CASSELLA COLOR COMPANY, OF NEW YORK, N. Y.

DARK-BLUE WOOL-DYE AND PROCESS OF MAKING SAME.

SPECIFICATION forming part of Letters Patent No. 749,195, dated January 12, 1904.

Application filed September 3, 1903. Serial No. 171,810. (No specimens.)

*To all whom it may concern:*

Be it known that I, MEINHARD HOFFMANN, a citizen of Prussia, and a resident of Frankfort-on-the-Main, in the Province of Hesse-Nassau and Kingdom of Prussia, Germany, have invented certain new and useful Improvements in Dark-Blue Wool-Dyes and Processes of Making Same, of which the following is a specification.

This invention has for its object the production of blue or black coloring-matters dyeing fast shades on wool which are derivatives of the hitherto unknown acetdiamidophenolsulfonic acid. This acid may be produced in the following manner: On dissolving acetylparaämidophenol in concentrated sulfuric acid a monosulfo-acid is formed in which the sulfo group occupies the ortho position to the hydroxyl. If this acid is nitrated, one nitro group enters into the remaining ortho position. The nitro acid so obtained when cautiously reduced yields the acetdiamidophenolsulfonic acid of the constitution $$C_6H_2OH(1)NH_2(2)NH.CO.CH_3(4)SO_3H(6.)$$

The method of production of the new acid and the colors deriving therefrom is illustrated by the following example:

Example: One hundred and fifty kilos of acetylparaämidophenol are introduced at 40° to 90° centigrade into seven hundred and fifty kilos sulfuric acid of 66° Baumé and heated for about two hours to 95° centigrade. This solution is then cooled to 0° centigrade, and two hundred and ten kilos of a mixture of equal parts nitric acid of 40° Baumé and sulfuric acid is slowly added at a temperature of from 0° to 5° centigrade. After twelve hours the nitrated mixture is diluted with three thousand liters of ice-water, so that the temperature does not exceed 30° centigrade, and at this temperature zinc-dust is slowly introduced till complete reduction has taken place. The monoacetyldiamidophenolsulfo-acid separates from the acid solution as colorless needles. It is rather difficultly soluble in water. Its salts are easily soluble. If the acetyldiamidophenolsulfo-acid is treated with nitrous acid, it is transformed into an easily-soluble yellow-colored diazo compound which reacts with amines or phenols, forming valuable coloring-matters. If it is, for instance, combined with a hydroxylated derivative of naphthalene—such as beta-naphthol, 1.8 dioxynaphthalene, 4 sulfo-acid, 1.8 dioxynaphthalene, 3.6 disulfo-acid—dyestuffs are obtained dyeing wool in an acid-bath dull claret or violet shades, which on being after-treated with chromate are turned into an intense blackish blue. These dyeings are distinguished by their excellent leveling property. They are, moreover, completely fast to light and milling.

The method of production is illustrated by the following example: 26.8 kilos of acetyldiamidophenolsulfonate of soda are acidulated in an aqueous solution with forty kilos hydrochloric acid of 21° Baumé and diazotized at 10° centigrade with seven kilos nitrite. The diazo compound is mixed at 0° centigrade with the solution of fifteen kilos beta-naphthol in three hundred liters water and thirty kilos caustic-soda lye of 40° Baumé. The formation of the coloring-matter is completed after twelve hours. It is then separated by neutralizing the free caustic soda with hydrochloric acid. The thus-obtained coloring-matter dissolves in water with a violet color, which on addition of acetic acid changes to a light scarlet. It is soluble in strong sulfuric acid with a violet shade.

Having thus described my invention, what I claim is—

1. The process of producing dark-blue mordant-dyeing wool-dyes by combining the diazotized acetdiamidophenolsulfonic acid of the constitution $$C_6H_2OH(1)NH_2(2)NH.CO.CH_3(4)SO_3H(6)$$

with a hydroxylated derivative of naphthalene, substantially as described.

2. The herein-described new azo dyestuff derived from acetdiamidophenolsulfonic acid of the constitution $$C_6H_2OH(1)NH_2(2)NH.CO.CH_3(4)SO_3H(6)$$

which is easily soluble in water with a violet color, turning into scarlet by addition of acetic acid, dissolving in strong sulfuric acid with a violet or bluish shade; dyeing wool in an acid-bath a dull claret shade, which on being after-treated with chromate is turned into a deep blue of excellent fastness, substantially as described.

Signed at Frankfort-on-the-Main, in the Province of Hesse-Nassau and Kingdom of Prussia, this 21st day of August, A. D. 1903.

MEINHARD HOFFMANN.

Witnesses:
JEAN GRUND,
CARL GRUND.